US008929538B2

(12) United States Patent
Liu (10) Patent No.: US 8,929,538 B2
(45) Date of Patent: Jan. 6, 2015

(54) METHOD AND APPARATUS FOR SWITCHING TALKING MODES AUTOMATICALLY

(75) Inventor: Yinong Liu, Beijing (CN)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 244 days.

(21) Appl. No.: 13/608,096

(22) Filed: Sep. 10, 2012

(65) Prior Publication Data

US 2013/0222514 A1    Aug. 29, 2013

(51) Int. Cl.
*H04M 1/00* (2006.01)

(52) U.S. Cl.
USPC .................................. 379/433.02; 455/556.1

(58) Field of Classification Search
CPC ............ H04M 2250/12; H04M 1/605; H04M 1/6041; H04M 1/03; H04M 1/04; H04M 1/72538; H04M 1/72563; H04M 1/0241; H04M 1/021; H04W 52/225; H04W 4/026; H04W 52/0254
USPC .................. 379/433.02; 455/569.1; 340/686.6
See application file for complete search history.

(56) References Cited

U.S. PATENT DOCUMENTS

| | | | |
|---|---|---|---|
| 6,349,225 B1* | 2/2002 | Lands et al. ................ | 455/575.3 |
| 6,819,946 B2* | 11/2004 | Hansson ..................... | 455/569.1 |
| 7,027,840 B2* | 4/2006 | McKee et al. ................ | 455/567 |
| 8,208,624 B2* | 6/2012 | Bowen ...................... | 379/433.02 |
| 8,373,648 B2* | 2/2013 | Shih et al. ..................... | 345/102 |
| 8,559,659 B2* | 10/2013 | Chu et al. ....................... | 381/150 |
| 2004/0185920 A1* | 9/2004 | Choi et al. ................ | 455/575.1 |
| 2009/0015425 A1 | 1/2009 | Palmqvist et al. | |
| 2009/0060170 A1 | 3/2009 | Coughlan et al. | |
| 2009/0147935 A1* | 6/2009 | Li et al. ..................... | 379/142.06 |
| 2012/0019149 A1* | 1/2012 | Shih et al. ..................... | 315/149 |
| 2013/0295906 A1* | 11/2013 | Chen et al. ................... | 455/418 |

OTHER PUBLICATIONS

Extended European Search Report, dated Jun. 5, 2013, corresponding in EP 13 00 0412.

* cited by examiner

*Primary Examiner* — Mohammad Islam
(74) *Attorney, Agent, or Firm* — Renner, Otto, Boisselle & Sklar LLP.

(57) ABSTRACT

Method and apparatus for switching talking mode automatically applicable to electronic equipment, which includes an accelerometer, proximity sensor and video camera. The method includes acquiring gravity information from the accelerometer during conversation between the electronic equipment and the other side of the conversation, and judging whether the electronic equipment is in a vertical state according to the gravity information; activating the video camera to take a capturing action if the electronic equipment is not in a vertical state, and acquiring distance information and/or image information, the distance information used for indicating distance to the captured object, and the image information used for indicating the captured object; and switching the talking mode to speakerphone mode if distance indicated by the distance information is greater than a first threshold value, and/or resolution of the image indicated by the image information is greater than a second threshold value.

14 Claims, 5 Drawing Sheets

METHOD AND APPARATUS FOR SWITCHING TALKING MODES AUTOMATICALLY

TECHNICAL FIELD

The present invention relates to the field of electronics, and in particular to a method and apparatus for switching talking modes automatically.

BACKGROUND ART

As electronic technologies and communication technologies rapidly develop, some electronic apparatuses, such as mobile phones, have become an indispensable part in the daily lives of people. Many functions are incorporated into them, bringing much convenience to the lives and works of people.

Taking a mobile phone as an example, at present, the talking mode of the mobile phone may be roughly classified into two types: one is a speakerphone mode, and the other is a receiver mode. The speakerphone mode refers to that a user initiates the speaker function by pressing a specific key (a physical key or a virtual key) on the user interface, such that the received voice is played via the speaker. Since the volume of the voice played via the loudspeaker is relatively higher, such a talking mode is most suitable for the circumstances where it is desired that the voice is heard by others besides the recipient. For example, for a panel meeting in holding a teleconference, all the participants should hear the voices of the other side in the conversation, and at this moment, the talking mode for receiving a call needs to be set as the speakerphone mode. The receiver mode is a manner in which the received voice is directly played via the audio playing module embedded in the mobile phone, and in which the volume is relatively lower. When a user is in conversation with the other side in the receiver mode, the mobile phone is usually placed in contact with an ear or close to the ear. For the sake of privacy protection and prevention of interference with others, the receiver mode is the most commonly used talking mode.

SUMMARY OF THE INVENTION

In the implementation of the present invention, the inventor found that in ordinary cases, a mobile phone operates generally in the receiver mode, and the speakerphone mode is only initiated when it is specially needed. However, since the initiation of the speakerphone mode needs pressing a specific key, complexity of operation is increased. Especially when both hands are not free, for example, when driving, if the speakerphone mode of a mobile phone is to be initiated, the user should pay attention to the mobile phone first, and then press the corresponding key on the user interface of the mobile phone, this undoubtedly increases the risk in driving.

The present invention is proposed in light of the above problems that existed in the prior art.

The embodiments of the present invention are addressed to provide a method and apparatus for switching talking mode automatically, so that it is convenient for the user in switching talking modes during conversation, increasing, (improving) experiences of the user.

According to a first aspect of the embodiments of the present invention, there is provided a method for switching talking mode automatically, the method being applicable to electronic equipment, the electronic equipment including an accelerometer, a proximity sensor and a video camera, wherein the method includes:

acquiring gravity information from the accelerometer during conversation between the electronic equipment and the other side of the conversation, and judging whether the electronic equipment is in a vertical state according to the gravity information;

activating the video camera to take a capturing action if the electronic equipment is not in a vertical state, and acquiring distance information and/or image information, the distance information being used for indicating the distance from the video camera to the object to be captured, and the image information being used for indicating the captured image; and switching the talking mode of the electronic equipment to a speakerphone mode if the distance indicated by the distance information is greater than a first threshold value, and/or the resolution of the image indicated by the image information is greater than a second threshold value.

According to a second aspect of the embodiments of the present invention, there is provided a method as described in the first aspect, wherein acquiring detection information from the proximity sensor if the electronic equipment is in a vertical state, the detection information being used for indicating whether there is an object close to the electronic equipment; and switching the talking mode of the electronic equipment to a receiver mode if it is determined according to the detection information that there is an object close to the electronic equipment.

According to a third aspect of the embodiments of the present invention, there is provided a method as described in the second aspect, wherein before acquiring detection information from the proximity sensor, the method further includes:

activating the proximity sensor to detect whether there is a object close to the electronic equipment.

According to a fourth aspect of the embodiments of the present invention, there is provided a method as described in the first aspect, wherein the method further includes:

activating the accelerometer to detect the gravity of the electronic equipment.

According to a fifth aspect of the embodiments of the present invention, there is provided an apparatus for switching talking mode automatically, the apparatus being contained in electronic equipment, the electronic equipment further includes an accelerometer, a proximity sensor and a video camera, wherein the apparatus includes:

a first acquiring unit, for acquiring gravity information from the accelerometer during conversation between the electronic equipment and the other side;

a first judging unit, for judging whether the electronic equipment is in a vertical state according to the gravity information acquired by the first acquiring unit;

a second acquiring unit, for activating the video camera to take a capturing action when the result of judgment of the first judging unit is that the electronic equipment is not in a vertical state, and for acquiring distance information and/or image information from the video camera, the distance information being used for indicating the distance from the video camera to the captured object, and the image information being used for indicating the captured image; and a switching unit, for switching the talking mode of the electronic equipment to a speakerphone mode when the distance indicated by the distance information acquired by the second acquiring unit is greater than a first threshold value, and/or the resolution of the image indicated by the image information acquired by the second acquiring unit is greater than a second threshold value.

According to a sixth aspect of the embodiments of the present invention, there is provided an apparatus as described in the fifth aspect, wherein the apparatus further includes:

a second judging unit, for judging whether the distance indicated by the distance information acquired by the second acquiring unit is greater than the first threshold value, and/or whether the resolution of the image indicated by the image information acquired by the second acquiring unit is greater than the second threshold value, such that the switching unit performs the switching operation when the result of the second judging unit is positive.

According to a seventh aspect of the embodiments of the present invention, there is provided an apparatus as described in the fifth aspect, wherein the apparatus further includes:

a third acquiring unit, for acquiring detection information from the proximity sensor when the result of the first judging unit is that the electronic equipment is in a vertical state, the detection information being used for indicating whether there is an object close to the electronic equipment;

the switching unit switches the talking mode of the electronic equipment to a receiver mode when it is determined according to the detection information acquired by the third acquiring unit that there is an object close to the electronic equipment.

According to an eighth aspect of the embodiments of the present invention, there is provided an apparatus as described in the seventh aspect, wherein the apparatus further includes:

a second activating unit, for, before the third acquiring unit acquires the detection information from the proximity sensor, activating the proximity sensor to detect whether there is an object close to the electronic equipment.

According to a ninth aspect of the embodiments of the present invention, there is provided an apparatus as described in the fifth aspect, wherein the apparatus further includes:

a first activating unit, for, before the first acquiring unit acquires the gravity information from the accelerometer, activating the accelerometer to detect the gravity of the electronic equipment.

According to a tenth aspect of the embodiments of the present invention, there is provided an electronic equipment, the electronic equipment includes an accelerometer, a proximity sensor and a video camera, wherein the electronic equipment further includes the apparatus for switching talking mode automatically as described in any one of the fifth to ninth aspects.

Advantages of the embodiments of the present invention exist in that a video camera, an accelerometer and a proximity sensor are used to detect the state of the electronic equipment, thereby analyzing which of the talking modes is applicable to the electronic equipment, for example, a speakerphone mode or a receiver mode, so as to perform the switching of the talking mode. With the embodiments of the present invention, the speakerphone mode may be released or activated without needing to search in the menu of the user interface of the electronic equipment, which is flexible and easy to be implemented for users, not only improving experiences of the users, but also increasing the interests of the electronic equipment.

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

BRIEF DESCRIPTION OF THE DRAWINGS

The drawings are included to provide further understanding of the present invention, which constitute a part of the specification and illustrate the preferred embodiments of the present invention, and are used for setting forth the principles of the present invention together with the description. The same element is represented with the same reference number throughout the drawings. In the drawings.

DETAILED DESCRIPTION OF THE INVENTION

The interchangeable terms "electronic apparatus" and "electronic device" include portable radio communication apparatus. The term "portable radio communication apparatus", which hereinafter is referred to as a "mobile terminal", "portable electronic device", or "portable communication device", includes all apparatuses such as mobile telephones, pagers, communicators, electronic organizers, personal digital assistants (PDAs), smartphones, portable communication devices or the like.

In the present application, embodiments of the invention are described primarily in the context of a portable electronic device in the form of a mobile telephone (also referred to as "mobile phone"). However, it shall be appreciated that the invention is not limited to the context of a mobile telephone and may relate to any type of appropriate electronic apparatus having the function of photographing and sound recording.

The preferred embodiments of the present invention are described as follows with reference to the drawings.

Embodiment 1

Figure 1:
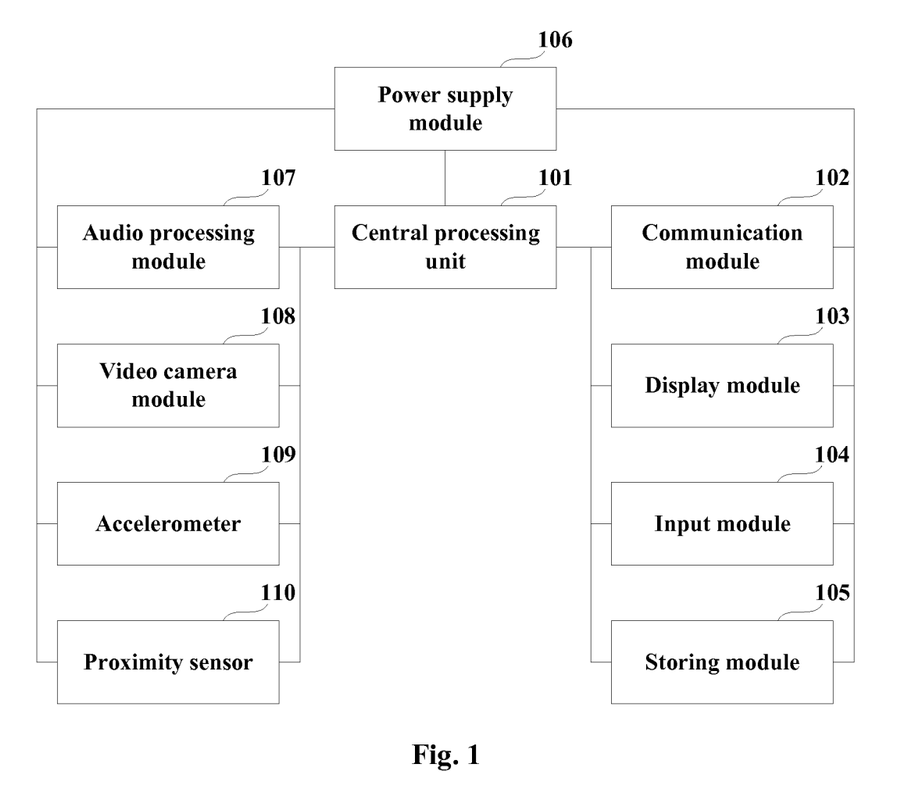
FIG. 1 is a schematic diagram of the composition of conventional electronic equipment.

The embodiment of the present invention provides a method for switching talking mode automatically, the method being applicable to electronic equipment. FIG. 1 is a schematic diagram of the composition of the electronic equipment, and FIG. 2 is a flowchart of the method.

Referring to FIG. 1, the electronic equipment includes a central processing unit 101, a communication module 102, a display module 103, an input module 104, a storing module 105, a power supply module 106, an audio processing module 107, a video camera module 108, an accelerometer 109, and a proximity sensor 110, etc. The functions of these components are the same as those in existing electronic equipment, which shall not be described any further.

Figure 2:
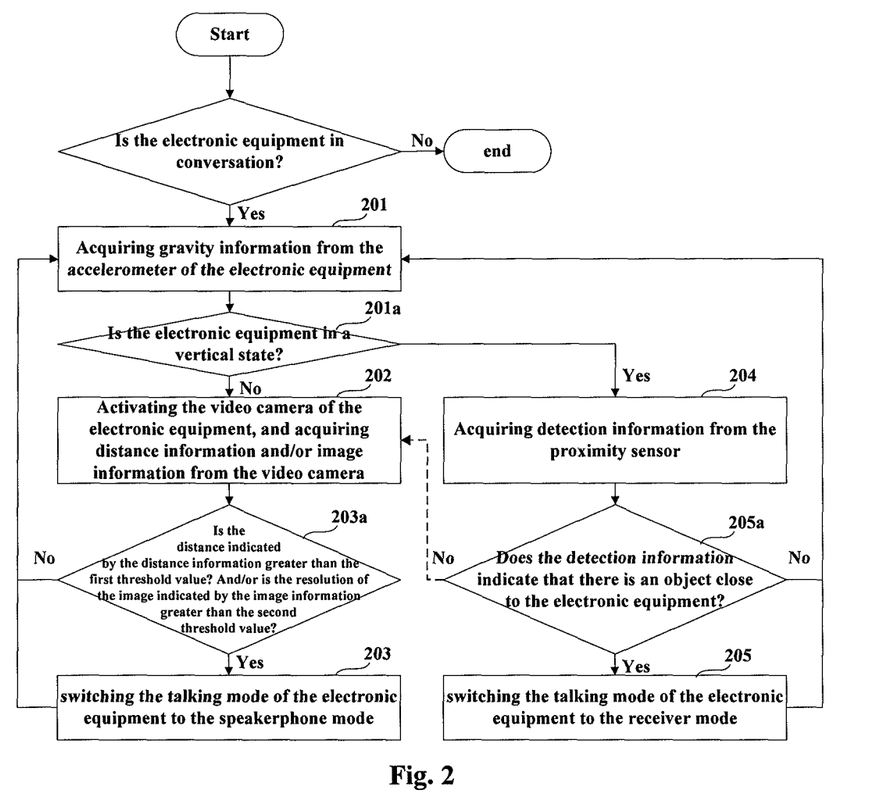
FIG. 2 is a flowchart of the method for switching talking mode automatically of the embodiments of the present invention.

Referring FIG. 2, the method of the embodiment of the present invention is applicable to the electronic equipment shown in FIG. 1, and is carried out by, for example, the central processing unit 101 in the electronic equipment, the electronic equipment at least including an accelerometer 109, a proximity sensor 110 and a video camera 108. As shown in FIG. 2, the method includes:

step 201: acquiring gravity information from the accelerometer 109 during conversation between the electronic equipment and the other side of the conversation, and judging whether the electronic equipment is in a vertical state according to the gravity information;

step 202: activating the video camera 108 of the electronic equipment to take a capturing action if the electronic equipment is not in a vertical state (step 201a), and acquiring distance information and/or image information, the distance information being used for indicating the distance from the video camera to the captured object, and the image information being used for indicating the captured object; and step 203: switching the talking mode of the electronic equipment to a speakerphone mode if the distance indicated by the distance information is greater than a first threshold value, and/or the resolution (pixel) of the image indicated by the image information is greater than a second threshold value (step 203a).

In this embodiment, when there is an incoming call entering into the electronic equipment or an outgoing call from the electronic equipment, after successful connection between the electronic equipment and the other side of the conversation is established, gravity information is acquired from the accelerometer 109 of the electronic equipment (step 201) in this embodiment. Since the gravity information detected by the accelerometer is different when the electronic equipment is in a vertical state and not in a vertical state, whether the electronic equipment is in a vertical state may be determined according to the gravity information.

As a component of the electronic equipment, the accelerometer 109 is used to detect the gravity of the electronic equipment and generate gravity information. The accelerometer is usually in an operational state when the electronic equipment is power on, and its working principle and working manner are the same as those in the prior art, which shall not be described any further. In another embodiment, the accelerometer 109 may also be activated to operate by using the method of this embodiment. That is, in step 201, during conversation between the electronic equipment and the other side of the conversation, before the gravity information is acquired from the accelerometer 109, a step of activating the accelerometer to start to work may further include activating the accelerometer to detect the gravity of the electronic equipment.

Figure 3:
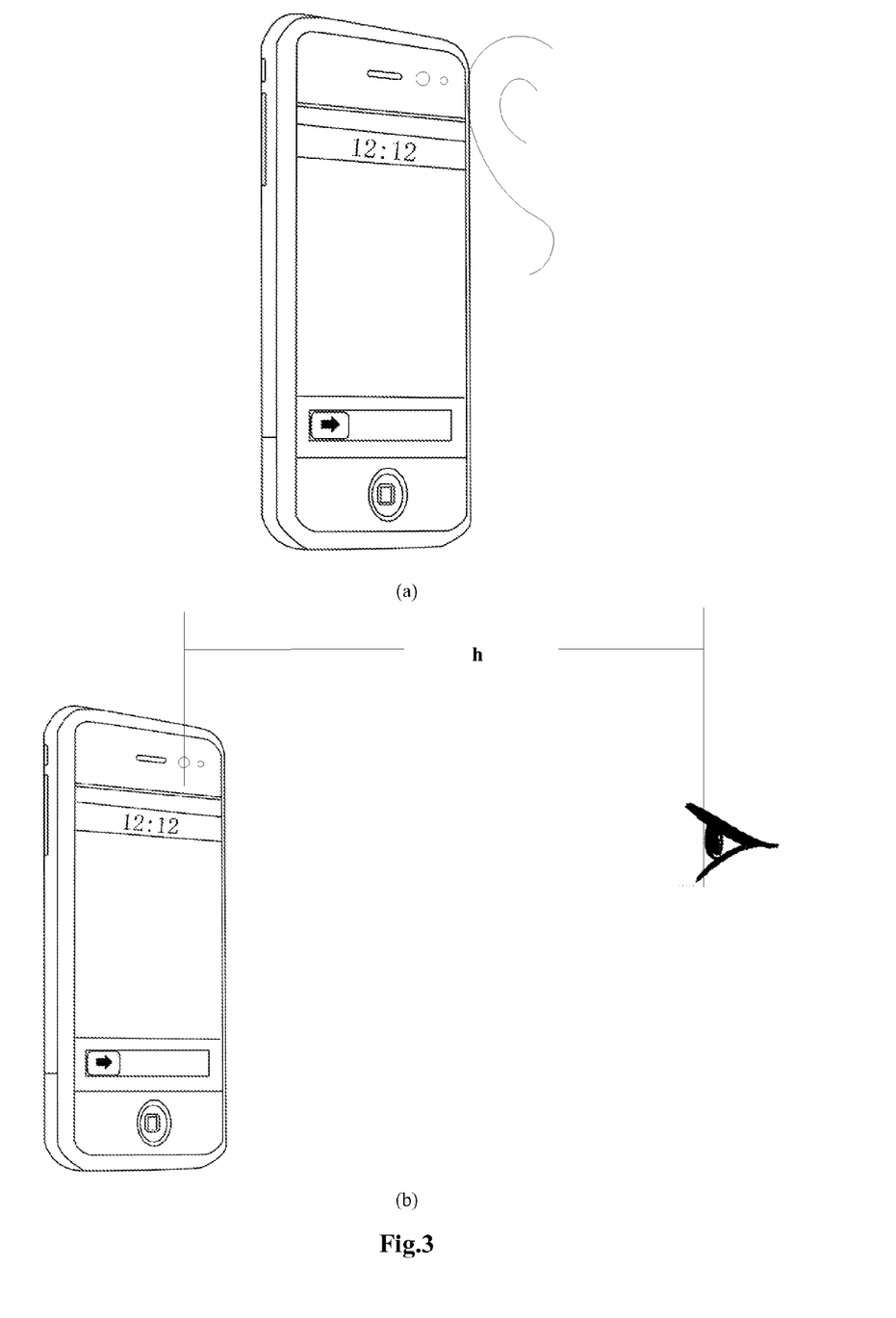
FIG. 3a is a schematic diagram of the electronic equipment in a vertical state.
FIG. 3b is a schematic diagram of the electronic equipment in a hand-held state.

In this embodiment, if the electronic equipment is in a vertical state, in most cases, a user has the receiver to be in contact with or close to an ear, such that the electronic equipment is in a vertical state. At this moment, as shown in FIG. 3a, the user may desire to have a conversation with the other side of the conversation via the receiver. If the electronic equipment is not in a vertical state, in most cases, the user puts the electronic equipment away from himself, has the electronic equipment placed at a fixed position or held by a hand. As shown FIG. 3b, the electronic equipment is away from the eyes of the user, and at this moment, the user may desire to have a conversation with the other side of the conversation in the speakerphone mode.

Hence, in this embodiment, when it is determined according to the acquired gravity information that the electronic equipment is not in a vertical state, the user may desire to activate the speakerphone mode of the electronic equipment, rather than desire to have a conversation with the other side in the receiver mode. At this moment, the video camera 108 of the electronic equipment is activated to take a capturing action (step 202) in this embodiment, and the video camera obtains some images by capturing, such as an image of the head of the user, and/or an image of the environment, etc., so as to generate image information corresponding to the images, such as pixel, and/or resolution, etc. Furthermore, the video camera generates distance information by automatically focusing during capturing, the distance information indicating the distance from the lens of the video camera to the captured object. After activating the video camera, the method of this embodiment may acquire the distance information from the video camera, and may also acquire the image information from the video camera, or may acquire both the distance information and the image information at the same time.

In this embodiment, whether the talking mode of the electronic equipment needs to be switched to the speakerphone mode may be determined according to the distance information, or the image information, or both the distance information and the image information (step 203 and step 203a).

In a mode of implementation, if (step 203a) the distance from the video camera to the captured object indicated by the distance information is greater than a first threshold value, it may be determined that the talking mode of the electronic equipment needs to be switched to the speakerphone mode (step 203). The first threshold value may be preset, and may be set according to the practice of user in using electronic equipment. For example, it may be set as 5 cm. Referring to FIG. 3b, taking that the first threshold value is 5 cm as an example, if the distance h indicated by the distance information is greater than 5 cm, it shows that the electronic equipment is away from the user, and it is determined that its talking mode needs to be switched to the speakerphone mode.

In another mode of implementation, if (step 203a) the resolution of the image indicated by the image information is greater than a second threshold value, it may be determined that the talking mode of the electronic equipment needs to be switched to the speakerphone mode (step 203). In this mode of implementation, whether the talking mode needs to be switched is determined by analyzing the resolution of the image captured by the video camera, rather than by the distance indicated by the distance information. If the electronic equipment is close to the user, the resolution of the captured image is relatively lower. According to this, a second threshold value is set in this embodiment for indicating resolution. When the resolution of the image captured by the video camera is greater than the second threshold value, it is considered that the image captured by the video camera 108 is relatively high. At this moment, the electronic equipment is away from the user and hence, it is determined that the talking mode needs to be switched to the speakerphone mode.

The above two modes of implementation are illustrative only, and in particular implementation, these two modes of implementation may be used jointly. For example, whether the distance indicated by the distance information is greater than the first threshold value and whether the resolution of the image indicated by the image information is greater than the second threshold value are both judged. Thus, a more accurate result of judgment may be obtained.

In this embodiment, when it is determined according to the acquired gravity information that the electronic equipment is in a vertical state (step 201a), the user may desire to have a conversation with the other side in the receiver mode, rather than in the speakerphone mode, as shown in FIG. 3a. At this moment, the method of this embodiment may further include the following steps:

step 204: acquiring detection information from the proximity sensor, the detection information being used for indicating whether there is an object close to the electronic equipment; and step 205: switching the talking mode of the electronic equipment to a receiver mode if it is determined according to the detection information (step 205a) that there is an object close to the electronic equipment.

In this embodiment, as described above, when the electronic equipment is in a vertical state, the user may desire to have a conversation with the other side in the receiver mode. At this moment, the method of this embodiment may acquire detection information from the proximity sensor of the electronic equipment, and determine according to the detection information whether the electronic equipment is close to the user.

In this embodiment, before the proximity sensor 110 of the electronic equipment is activated to acquire the detection information, the proximity sensor of the electronic equipment may be activated to start to operate, and the proximity sensor will detect whether there is an object (the user) close to the electronic equipment. After activating the proximity sensor 110, the method of this embodiment may acquire the detection information from the proximity sensor 110. In this embodiment, the step of activating the proximity sensor 110 of the electronic equipment to start to operate is not necessary, since for the electronic equipment, the proximity sensor 110 is usually in an operational state if only the electronic equipment is power on. In this embodiment, the detection information may be directly acquired from the proximity sensor if only it is judged that the electronic equipment is in a vertical state.

In this embodiment, whether the talking mode is switched to the receiver mode may be determined according to the detection information.

In a mode of implementation, if it is indicated by the detection information that there is an object close to the electronic equipment, it shows that the user desires to have a conversation with the other side in the receiver mode. At this moment, the talking mode of the electronic equipment is switched to the receiver mode in the method of this embodiment. On the contrary, if it is indicated by the detection information that there is no object close to the electronic equipment, there will be two cases: one is that the electronic equipment is still away from the user, and in such a case, return back to step 201, acquiring gravity information from the accelerometer, and performing subsequent processing shown in FIG. 2; and the other case is that there is an error in the judgment of the proximity sensor or for improving the accuracy of the detection, activating the video camera to operate may be included in this embodiment, that is, returning back to step 202, and determining whether to switch the talking mode of the electronic equipment according to the result of capturing of the video camera. The subsequent processing after returning back to steps 201 and 202 are the same as those of steps 201 and 202 as described previously, which shall not be described any further.

In this embodiment, when there is an incoming call entering into the electronic equipment or an outgoing call from the electronic equipment, and a connection between the electronic equipment and the other side of the conversation is established successfully, during the conversation between the electronic equipment and the other side, the method of this embodiment may be carried out to perform the switching of the talking mode automatically. The accelerometer 109 and the proximity sensor 110 may be activated to start to operate, and gravity information and detection information may be acquired respectively from the accelerometer and the proximity sensor; and in a case where the accelerometer and the proximity sensor themselves are in operational states, corresponding gravity information and detection information may be directly acquired from the accelerometer and the proximity sensor, respectively.

In the embodiment of the present invention, a video camera 108, an accelerometer 109 and a proximity sensor 110 of electronic equipment are used to detect the state of the electronic equipment, thereby analyzing which of the talking modes is applicable to the electronic equipment, for example, a speakerphone mode or a receiver mode, so as to perform the switching of the talking mode automatically. With the embodiments of the present invention, the speakerphone mode may be released or activated without needing to search in the menu of the user interface of the electronic equipment, which is flexible and easy to be implemented for users, not only improving experiences of the users, but also increasing the interests of the electronic equipment.

Embodiment 2

Figure 4:
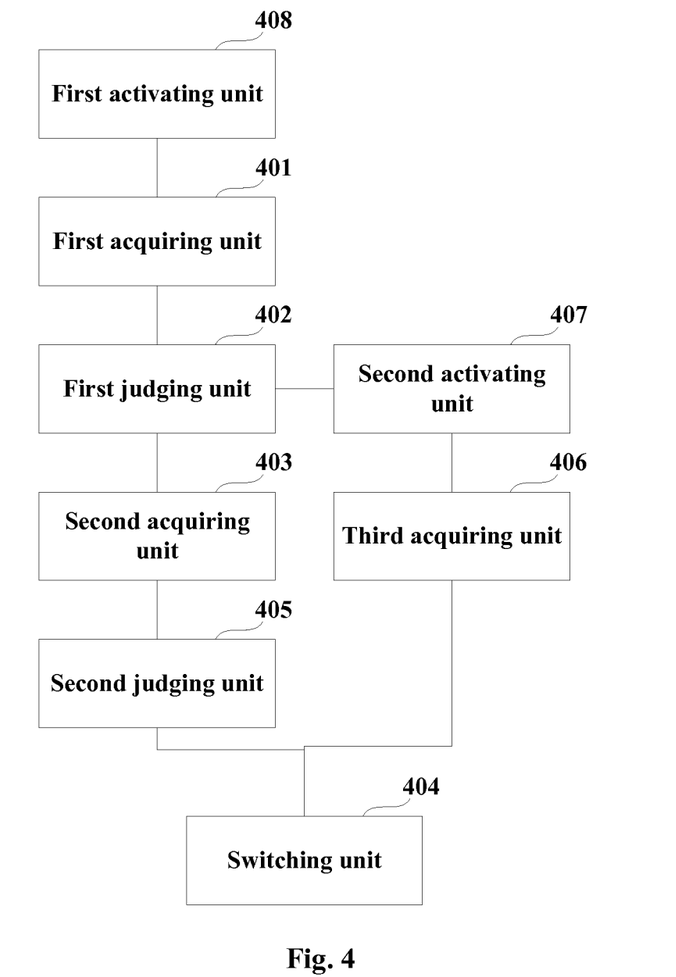
FIG. 4 is a schematic diagram of the composition of the apparatus for switching talking mode automatically of the embodiments of the present invention.

The embodiments of the present invention further provide an apparatus for switching talking mode automatically, the apparatus being contained in electronic equipment, for example, the electronic equipment shown in FIG. 1. The electronic equipment further includes at least an accelerometer 109, a proximity sensor 110 and a video camera 108. FIG. 4 is a schematic diagram of the composition of the apparatus for switching talking mode automatically. Referring to FIG. 4, the apparatus includes:

a first acquiring unit 401, for acquiring gravity information from the accelerometer during conversation between the electronic equipment and the other side of the conversation;

a first judging unit 402, for judging whether the electronic equipment is in a vertical state according to the gravity information acquired by the first acquiring unit 401;

a second acquiring unit 403, for activating the video camera to take a capturing action when the result of judgment of the first judging unit 401 is that the electronic equipment is not in a vertical state, and for acquiring distance information and/or image information from the video camera, the distance information being used for indicating the distance from the video camera to the captured object, and the image information being used for indicating the captured object; and a switching unit 404, for switching the talking mode of the electronic equipment to a speakerphone mode when the distance indicated by the distance information acquired by the second acquiring unit 403 is greater than a first threshold value, and/or the resolution of the image indicated by the image information acquired by the second acquiring unit 403 is greater than a second threshold value.

In this embodiment, the apparatus further includes:

a second judging unit 405, for judging whether the distance indicated by the distance information acquired by the second acquiring unit 403 is greater than the first threshold value, and/or whether the resolution of the image indicated by the image information acquired by the second acquiring unit 403 is greater than the second threshold value, such that the switching unit 404 performs the switching operation when the result of judgment of the second judging unit 405 is positive.

In this embodiment, the apparatus further includes:

a third acquiring unit 406, for acquiring detection information from the proximity sensor when the result of judgment of the first judging unit 402 is that the electronic equipment is in a vertical state, the detection information being used for indicating whether there is an object close to the electronic equipment; at this moment, the switching unit 404 switches the talking mode of the electronic equipment to the receiver mode when it is determined according to the detection information that there is an object close to the electronic equipment.

In this embodiment, the apparatus further includes:

a second activating unit 407, for, before the third acquiring unit 406 acquires the detection information from the proximity sensor, activating the proximity sensor to detect whether there is an object close to the electronic equipment.

In this embodiment, the apparatus further includes:

a first activating unit 408, for, before the first acquiring unit 401 acquires the gravity information from the accelerometer, activating the accelerometer to detect the gravity of the electronic equipment.

The components of the apparatus for switching talking mode automatically of the embodiment of the present invention are respectively used to carry out the steps of the method of Embodiment 1. As the steps and the particular modes of implementation are described in detail in Embodiment 1, the contents of which being incorporated herein, they shall not be described any further.

In the embodiment of the present invention, a video camera, an accelerometer and a proximity sensor of electronic equipment are used to detect the state of the electronic equipment, thereby analyzing which of the talking modes is applicable to the electronic equipment, for example, a speakerphone mode or a receiver mode, so as to perform the switching of the talking mode automatically. With the embodiments of the present invention, the speakerphone mode may be released or activated without needing to search in the menu of the user interface of the electronic equipment, which is flexible and easy to be implemented for users, not only improving experiences of the users, but also increasing the interests of the electronic equipment.

Embodiment 3

Figure 5:
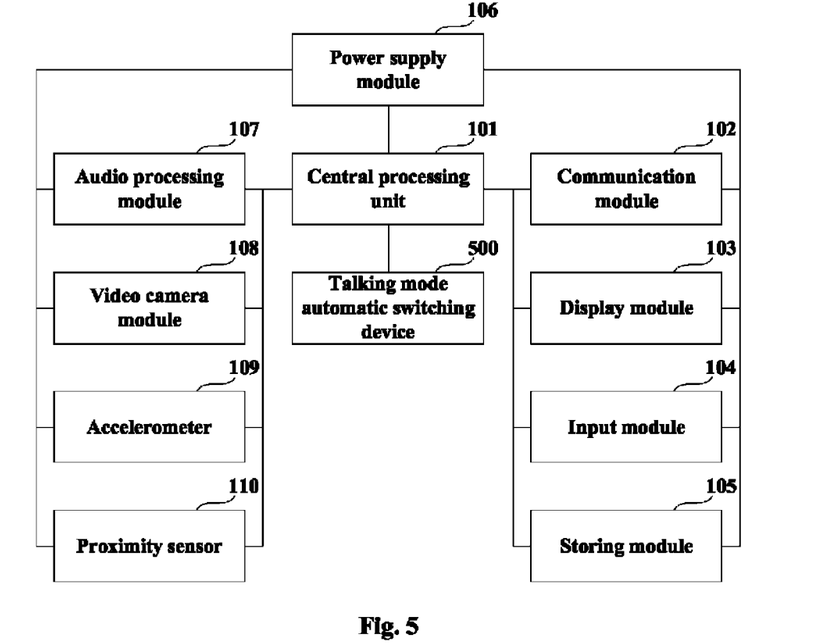
FIG. 5 is a schematic diagram of the composition of the electronic equipment of the embodiments of the present invention.

The embodiments of the present invention further provide electronic equipment. FIG. 5 is a schematic diagram of the composition of the electronic equipment.

Referring to FIG. 5, the electronic equipment differs from that shown in FIG. 1 in that a talking mode automatic switching device 500 is added. In FIG. 5, the talking mode automatic switching device 500 being a single module is taken as an example. However, this embodiment is not limited thereto. For example, the talking mode automatic switching device 500 may be integrated into the central processing unit 101 as a component thereof for performing its function.

In this embodiment, the talking mode automatic switching device 500 of the electronic equipment may be realized by the apparatus for switching talking mode automatically of Embodiment 2, and the contents of Embodiments 2 and 1 are incorporated herein, which shall not be described any further.

In the embodiment of the present invention, a video camera 108, an accelerometer 109 and a proximity sensor 110 are used to detect the state of the electronic equipment, thereby analyzing which of the talking modes is applicable to the electronic equipment, for example, a speakerphone mode or a receiver mode, so as to perform the switching of the talking mode automatically. With the embodiments of the present invention, the speakerphone mode may be released or activated without needing to search in the menu of the user interface of the electronic equipment, which is flexible and easy to be implemented for users, not only improving experiences of the users, but also increasing the interests of the electronic equipment.

The preferred embodiments of the present invention are described above with reference to the drawings. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

It should be understood that each of the parts of the present invention may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

The description or blocks in the flowcharts or of any process or method in other manners may be understood as being indicative of including one or more modules, segments or parts for realizing the codes of executable instructions of the steps in specific logic functions or processes, and that the scope of the preferred embodiments of the present invention includes other implementations, wherein the functions may be executed in manners different from those shown or discussed, including executing the functions according to the related functions in a substantially simultaneous manner or in a reverse order, which should be understood by those skilled in the art to which the present invention pertains.

The logic and/or steps shown in the flowcharts or described in other manners here may be, for example, understood as a sequence list of executable instructions for realizing logic functions, which may be implemented in any computer readable medium, for use by an instruction executing system, device or apparatus (such as a system including a computer, a system including a processor, or other systems capable of extracting instructions from an instruction executing system, device or apparatus and executing the instructions), or for use in combination with the instruction executing system, device or apparatus. As used herein, "a computer readable medium" can be any device that can contain, store, communicate with, propagate or transmit programs for use by an instruction executing system, device or apparatus, or can be used with the instruction executing system, device or apparatus. A computer readable medium may be, for example, but not limited to, a magnetic, optical, electromagnetic, infrared or semiconductor system, device, apparatus, or a propagation medium. More particular examples (inexhaustive lists) of a computer readable medium may include the following: an electrical connecting portion (electronic device) having one or more wirings, a portable computer hardware box (magnetic device), a random access memory (RAM) (electronic device), a read-only memory (ROM) (electronic device), an erasable programmable read-only memory (EPROM or flash memory) (electronic device), an optical fiber (optical device), and a portable compact disk read-only memory (CDROM) (optical device). Furthermore, a computer readable medium may be paper or other appropriate media on which the programs may be printed, as the programs may be obtained electronically through scanning optically the paper or other appropriate media and then compiling, interpreting, or processing in other appropriate manners, as necessary, and then the programs are stored in the computer memory.

The above description and drawings show various features of the present invention. It should be understood that a person of ordinary skill in the art may prepare suitable computer codes to carry out each of the steps and processes described above and illustrated in the drawings. It should also be understood that the above-described terminals, computers, servers, and networks, etc. may be of any type, and the computer codes may be prepared according to the disclosure contained herein to carry out the present invention by using the devices.

Particular embodiments of the present invention have been disclosed herein. Those skilled in the art will readily recognize that the present invention is applicable in other environments. In practice, there exist many embodiments and implementations. The appended claims are by no means intended to limit the scope of the present invention to the above particular embodiments. Furthermore, any reference to "a device to . . . " is an explanation of device plus function for describing elements and claims, and it is not desired that any element using no reference to "a device to . . . " is understood as an element of device plus function, even though the wording of "device" is included in that claim.

Although a particular preferred embodiment or embodiments have been shown and the present invention has been described, it is obvious that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present invention with respect to structure. Furthermore, although a particular feature of the present invention is described with respect to only one or more of the illustrated embodiments, such a feature may be combined with one or more other features of other embodiments as desired and in consideration of advantageous aspects of any given or particular application.

The invention claimed is:

1. A method for switching talking mode automatically, the method being applicable to electronic equipment, the electronic equipment comprising an accelerometer, a proximity sensor and a video camera, wherein the method comprising:
    acquiring gravity information from the accelerometer during conversation between the electronic equipment and the other side of the conversation, and judging whether the electronic equipment is in a vertical state according to the gravity information;
    activating the video camera to take a capturing action if the electronic equipment is not in a vertical state, and acquiring distance information and/or image information, the distance information being used for indicating the distance from the video camera to the captured object, and the image information being used for indicating the captured object; and
    switching the talking mode of the electronic equipment to a speakerphone mode if the distance indicated by the distance information is greater than a first threshold value, and/or the resolution of the image indicated by the image information is greater than a second threshold value.

2. The method according to claim 1, further comprising acquiring detection information from the proximity sensor if the electronic equipment is in a vertical state, the detection information being used for indicating whether there is an object close to the electronic equipment; and
    switching the talking mode of the electronic equipment to a receiver mode if it is determined according to the detection information that there is an object close to the electronic equipment.

3. The method according to claim 2, wherein before acquiring detection information from the proximity sensor, the method further comprises:
    activating the proximity sensor to detect whether there is an object close to the electronic equipment.

4. The method according to claim 1, wherein before acquiring gravity information from the accelerometer, the method further comprises:
    activating the accelerometer to detect the gravity of the electronic equipment.

5. An apparatus for switching talking mode automatically, the apparatus being contained in an electronic equipment, the electronic equipment further comprising an accelerometer, a proximity sensor and a video camera, wherein the apparatus comprises:
    a first acquiring unit configured to acquire gravity information from the accelerometer during a conversation between the electronic equipment and the other side of the conversation;
    a first judging unit configured to judge whether the electronic equipment is in a vertical state according to the gravity information acquired by the first acquiring unit;

a second acquiring unit configured to activate the video camera to take a capturing action when the result of judgment of the first judging unit is that the electronic equipment is not in a vertical state, and for acquiring distance information and/or image information from the video camera, the distance information being used for indicating the distance from the video camera to the captured object, and the image information being used for indicating the captured object; and a switching unit configured to switch the talking mode of the electronic equipment to a speakerphone mode when the distance indicated by the distance information acquired by the second acquiring unit is greater than a first threshold value, and/or the resolution of the image indicated by the image information acquired by the second acquiring unit is greater than a second threshold value.

6. The apparatus according to claim 5, wherein the apparatus further comprises:

a second judging unit configured to judge whether the distance indicated by the distance information acquired by the second acquiring unit is greater than the first threshold value, and/or whether the resolution of the image indicated by the image information acquired by the second acquiring unit is greater than the second threshold value, such that the switching unit performs the switching operation when the result of judgment of the second judging unit is positive.

7. The apparatus according to claim 5, wherein the apparatus further comprises:

a third acquiring unit configured to acquire detection information from the proximity sensor when the result of judgment of the first judging unit is that the electronic equipment is in a vertical state, the detection information being used for indicating whether there is an object close to the electronic equipment; and wherein the switching unit switches the talking mode of the electronic equipment to a receiver mode when it is determined according to the detection information acquired by the third acquiring unit that there is an object close to the electronic equipment.

8. The apparatus according to claim 7, wherein the apparatus further comprises:

a second activating unit configured, before the third acquiring unit acquires the detection information from the proximity sensor, to activate the proximity sensor to detect whether there is an object close to the electronic equipment.

9. The apparatus according to claim 5, wherein the apparatus further comprises:

a first activating unit configured, before the first acquiring unit acquires the gravity information from the accelerometer, to activate the accelerometer to detect the gravity of the electronic equipment.

10. An electronic equipment, comprising an accelerometer, a proximity sensor and a video camera, wherein the electronic equipment further comprises the apparatus for switching talking mode automatically as claimed in claim 5.

11. An electronic equipment, comprising an accelerometer, a proximity sensor and a video camera, wherein the electronic equipment further comprises the apparatus for switching talking mode automatically as claimed in claim 6.

12. An electronic equipment, comprising an accelerometer, a proximity sensor and a video camera, wherein the electronic equipment further comprises the apparatus for switching talking mode automatically as claimed in claim 7.

13. An electronic equipment, comprising an accelerometer, a proximity sensor and a video camera, wherein the electronic equipment further comprises the apparatus for switching talking mode automatically as claimed in claim 8.

14. An electronic equipment, comprising an accelerometer, a proximity sensor and a video camera, wherein the electronic equipment further comprises the apparatus for switching talking mode automatically as claimed in claim 9.

\* \* \* \* \*

UNITED STATES PATENT AND TRADEMARK OFFICE
CERTIFICATE OF CORRECTION

| | | |
|---|---|---|
| PATENT NO. | : 8,929,538 B2 | Page 1 of 1 |
| APPLICATION NO. | : 13/608096 | |
| DATED | : January 6, 2015 | |
| INVENTOR(S) | : Yinong Liu | |

It is certified that error appears in the above-identified patent and that said Letters Patent is hereby corrected as shown below:

On the Title Page, item (30), should read -- "This application claims priority to Chinese patent application no. 201210048369.0 filed on February 28, 2012."

Signed and Sealed this
Twelfth Day of May, 2015

Michelle K. Lee
*Director of the United States Patent and Trademark Office*